United States Patent
Koizumi (12)
(10) Patent No.: US 6,678,372 B1
(45) Date of Patent: Jan. 13, 2004

(54) TELEPHONE TERMINAL CAPABLE OF EFFECTIVELY MAKING USE OF A COMMUNICATION HISTORY

(75) Inventor: Fumiaki Koizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/340,008

(22) Filed: Jun. 25, 1999

(30) Foreign Application Priority Data

Jun. 26, 1998 (JP) .......................................... 10-195145

(51) Int. Cl.[7] .............................................. H04M 1/00
(52) U.S. Cl. ............. 379/354; 379/355.02; 379/356.01; 379/356.05; 379/355.05
(58) Field of Search ............................ 379/354, 355.02, 379/355.04, 355.09, 355.1, 93.23

(56) References Cited

U.S. PATENT DOCUMENTS

| | | | |
|---|---|---|---|
| 4,161,626 A | * | 7/1979 | Waldo |
| 4,924,496 A | | 5/1990 | Figa et al. |
| 5,146,490 A | * | 9/1992 | Beckman |
| 5,592,546 A | * | 1/1997 | Takahashi |
| 5,740,233 A | * | 4/1998 | Cave et al. |

FOREIGN PATENT DOCUMENTS

| | | |
|---|---|---|
| EP | 0 462 488 A2 | 12/1991 |
| EP | 0 474 555 A2 | 3/1992 |
| EP | 0 494 526 A2 | 7/1992 |
| JP | 10-23134 | 1/1998 |
| JP | 10-126483 | 5/1998 |
| JP | 10-145525 | 5/1998 |
| WO | WO 98/16049 | 4/1998 |

* cited by examiner

*Primary Examiner*—Duc Nguyen
(74) *Attorney, Agent, or Firm*—Scully, Scott, Murphy & Presser (57) ABSTRACT

A telephone terminal is connected to a line network and has an individual terminal number. The telephone terminal comprises a clock section for measuring date and hour. A memory section is for memorizing a call telephone number as a communication telephone number on call. The memory section is for memorizing a reception telephone number as the communication telephone number on reception. The memory section further memorizes communication information in correspondence to the communication telephone number. The communication information and the communication telephone number are displayed on a display section. A control section controls the memory section to make the memory section memorize the communication information in correspondence to the communication telephone number. The control section controls the display section to make the display section display the communication telephone number and the communication information.

6 Claims, 10 Drawing Sheets

COMMUNICATION HISTORY UP TO NOW

COMMUNICATION HISTORY OF LAST MONTH

COMMUNICATION HISTORY DURING XX DAYS

TELEPHONE TERMINAL CAPABLE OF EFFECTIVELY MAKING USE OF A COMMUNICATION HISTORY

BACKGROUND OF THE INVENTION

This invention relates to a telephone terminal capable of administrating a history of calling and reception.

A telephone terminal may be, for example, a mobile telephone device such as a portable telephone device. In addition, the telephone terminal may be a subscriber telephone device. Such a telephone terminal comprises a display unit for displaying numerals. A conventional telephone terminal displays a calling telephone number on the display unit when the conventional telephone device is used as a calling telephone terminal. Furthermore, the conventional telephone terminal stores a previous calling telephone number therein in order to display the previous calling telephone number.

In addition, the conventional telephone terminal may display a reception telephone number when the conventional telephone terminal is used as a reception telephone terminal.

As described above, the conventional telephone device merely displays the calling telephone number and the reception telephone number. Although the conventional telephone terminal stores the calling telephone number and the reception telephone number as stored telephone numbers therein in order to display the stored telephone numbers as a communication history on the display unit, it is impossible to effectively make use of the communication history in the conventional telephone device.

SUMMARY OF THE INVENTION

It is therefore an object of this invention to provide a telephone terminal capable of effectively making use of a communication history.

Other objects of this invention will become clear as the description proceeds.

On describing the gist of this invention, it is possible to understand that a telephone terminal is connected to a line network and has an individual terminal number.

According to this invention, the telephone terminal comprises (A) clock means for measuring date and hour, (B) memory means for memorizing a call telephone number as a communication telephone number on call, the memory means memorizing a reception telephone number as the communication telephone number on reception, the memory means further memorizing communication information in correspondence to the communication telephone number, (C) display means for displaying the communication telephone number and the communication information, and (D) control means for controlling the memory means to make the memory means memorize the communication information in correspondence to the communication telephone number, the control means controlling the display means to make the display means display the communication telephone number and the communication information.

DESCRIPTION OF THE PREFERRED EMBODIMENT

Figure 1:
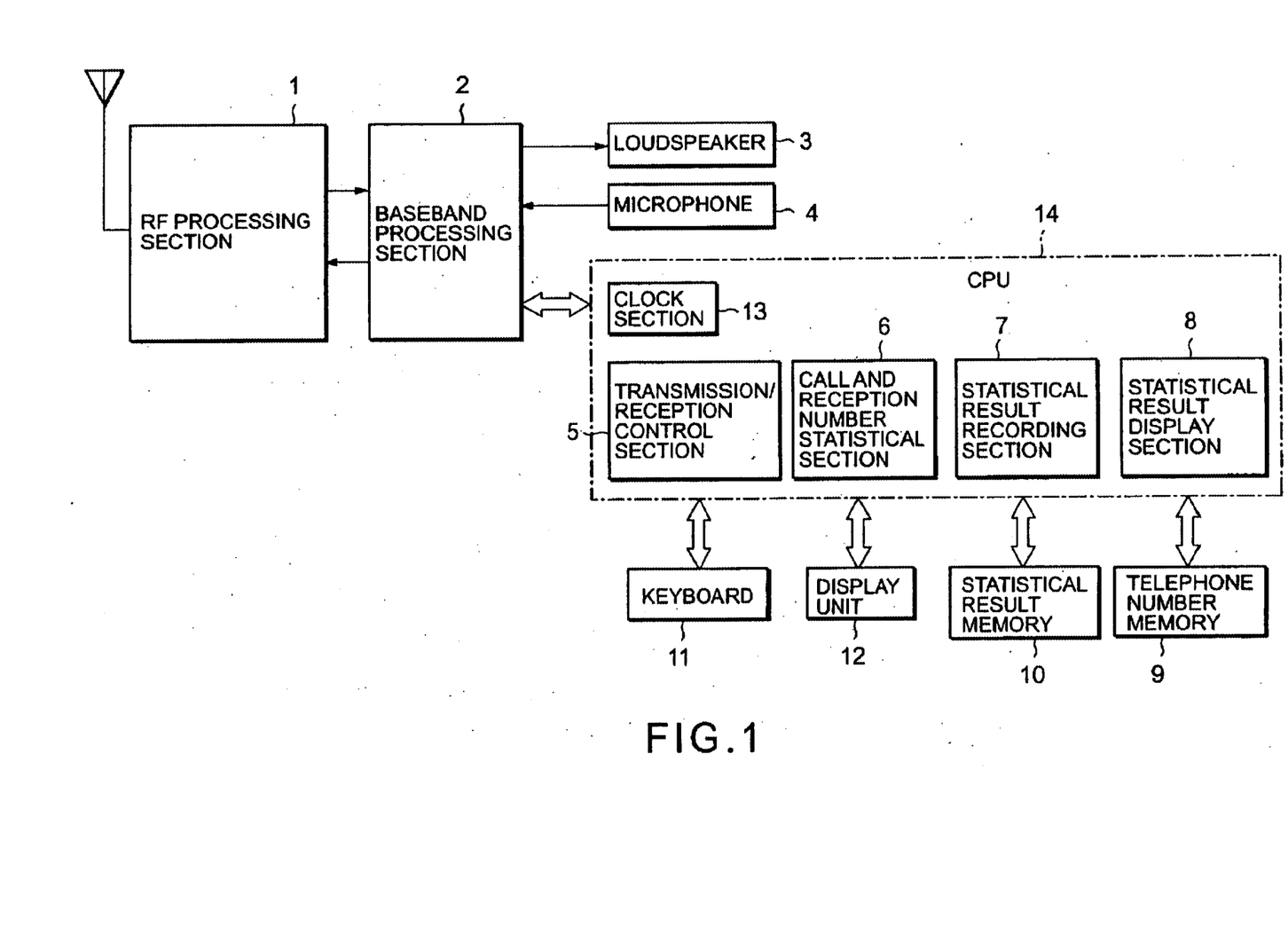
FIG. 1 is a block diagram of a telephone terminal according to a first embodiment of this invention.

Referring to FIG. 1, description will proceed to a telephone terminal according to a first embodiment of this invention. The illustrated telephone terminal may be used as a mobile telephone device such as a portable telephone device. The telephone terminal comprises an RF (Radio Frequency) processing section 1 for receiving a reception RF signal to demodulated the reception RF signal into a reception baseband signal. Furthermore, the RF processing section 1 modulates a transmission baseband signal into a transmission RF signal to transmit the transmission RF signal to space.

The telephone terminal further comprises a baseband processing section which takes out reception data from the reception baseband signal to produce a speech signal on the basis of the reception data. The speech signal is supplied to a loudspeaker 3 to be outputted as an output voice. Furthermore, the baseband processing section 2 produces the transmission baseband signal in accordance with an input voice inputted from a microphone 4.

The baseband processing section 2 is connected to a central processing unit (CPU) 14. The CPU 14 comprises a transmission-reception control section 5, a call and reception number statistical section 6, a statistical result recording section 7, a statistical result displaying section 8, and a clock section 13. The CPU 14 is connected to a telephone number memory 9, and a statistical result memory 10, a keyboard 11, and a display unit 12.

The clock section 13 measures a duration of communication time. The transmission-reception control section 5 controls the process of the above-mentioned transmission and reception. The transmission-reception control section 5 informs the call and reception number statistical section 6 of the telephone number of party and the communication time duration.

The transmission-reception control section 5 watches the clock section 13 to know a communication start time and a communication end time. The transmission-reception control section 5 calculates a difference time between the communication start time and the communication end time to supply the call and reception number statistical section 6 with the difference time as the communication time duration. The transmission-reception control section 5 produces a telephone number data displaying command, a statistical result displaying command, and a memory reset command, as will be described later.

Figure 2:
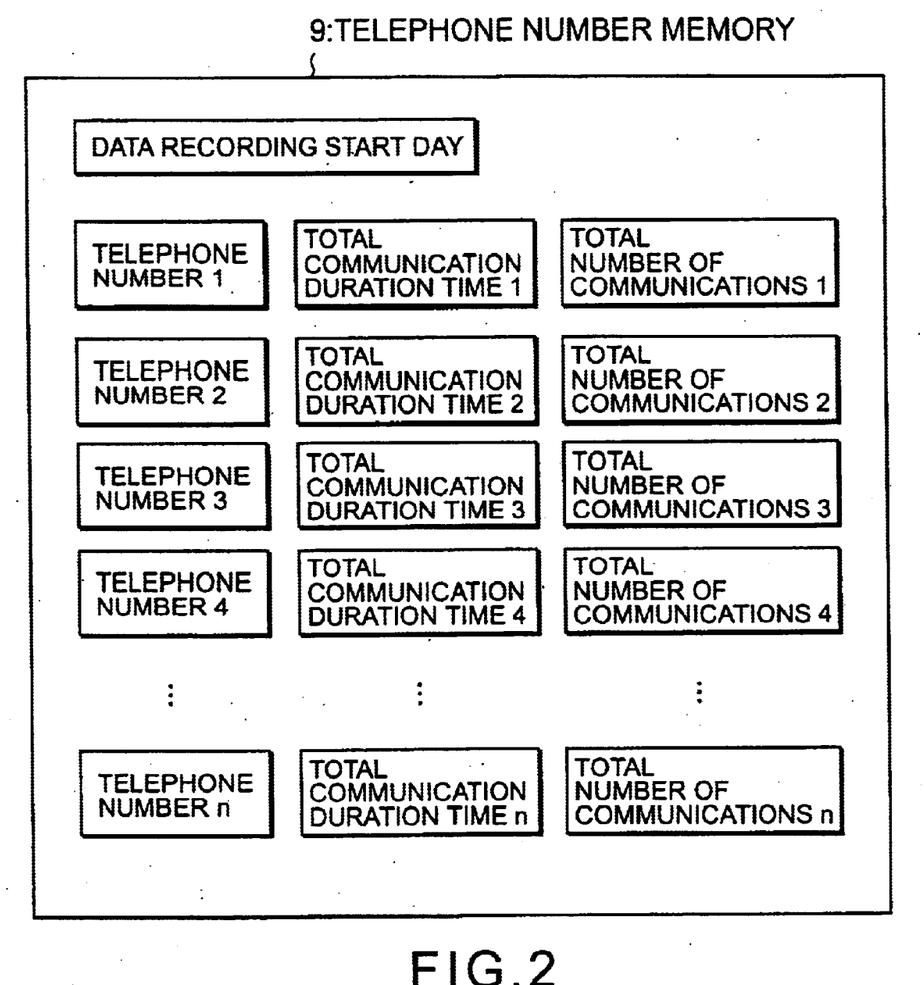
FIG. 2 shows a view for describing an example of contents memorized in a telephone number memory Illustrated in FIG. 1.

The telephone number memory 9 memorizes the telephone numbers, the total communication time duration, the number of communications which are obtained by statistical process. In the example being illustrated in FIG. 2, the telephone number memory 9 memorizes the total communication time duration and the number of communications in correspondence to each of telephone numbers. In addition, the telephone number memory 9 memorizes a data recording start day at which the telephone number memory 9 starts memorizing data.

The statistical result recording section 7 performs a statistical result recording process and a memory resetting process. In the statistical result recording process, the total number of communications is taken out in a predetermined number of a descending order in view of telephone numbers having long communication duration time, within a predetermined period memorized in the telephone number memory 9. The total number of communications are written in the statistical result memory 10 together with the corresponding telephone numbers and total communication duration time.

Figure 3:
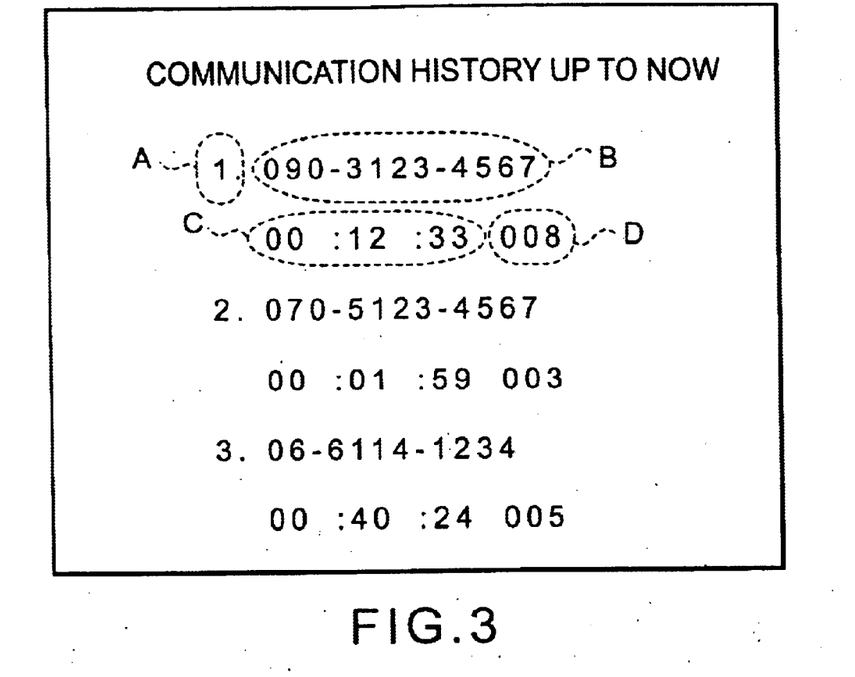
FIG. 3 is a display example of statistical data recorded in the telephone number memory.

When a telephone number data display command is inputted from the key board 11, the statistical result display section 8 displays data memorized in the telephone number memory 9 on the display unit 12 in order to confirming the history of communication up to now. FIG. 3 shows an example of display of statistical result data recorded in the telephone number memory 9. In FIG. 3, a broken line A indicates a rank of the length of total communication duration time. A broken line B indicates the telephone number of the called party. A broken line C indicates the total communication duration time. A broken line D indicates the total number of communications.

Figure 4:
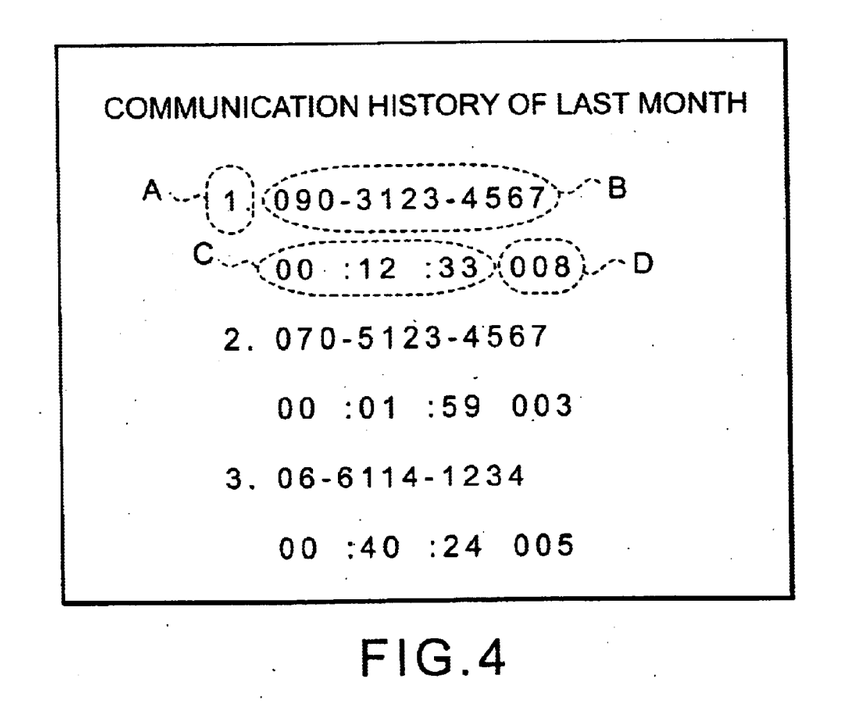
FIG. 4 is a display example of data recorded in a statistical result memory illustrated in FIG. 1.

The statistical result display section 8 displays data recorded in the statistical result memory 10 when the above-mentioned statistical result display command is inputted. FIG. 4 shows an example of display of data recorded in the statistical result memory 10. In FIG. 4, a broken line A indicates a rank of the length of total communication duration time. A broken line B indicates the telephone number of the called party. A broken line C indicates the total communication duration time. A broken line D indicates the total number of communications.

The telephone number data display command and the statistical result display command are given from the transmission-reception control section 5 to the statistical result display section 8 upon manipulation of the key board 11 by a user of the telephone terminal.

Figure 5:
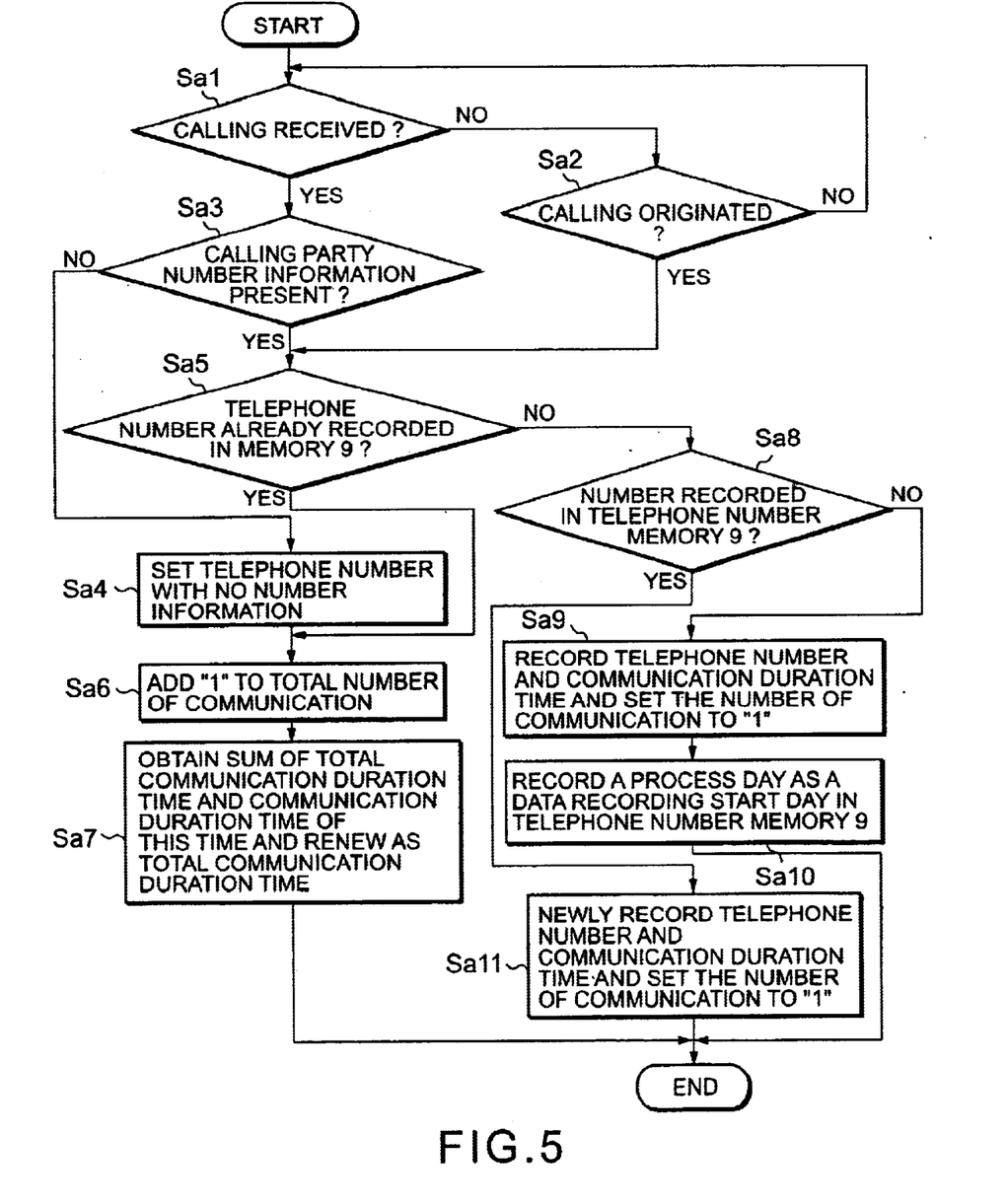
FIG. 5 is a a flow chart for describing a statistical process of calling and reception telephone numbers in the telephone terminal illustrated in FIG. 1.

Referring to FIG. 5, the transmission-reception control section 5 judges whether or not there is a reception at a first step Sa1 in the statistical process of telephone numbers at call and reception. In case where there is not the reception at the first step Sa1, the transmission-reception control section 5 judges whether or not a call is carried out at a second step Sa2. In case where the call is not carried out at the second step Sa2, operation returns back to the first step Sa1.

In case where there is the reception at the first step Sa1, the transmission-reception control section 5 judges whether or not a call party number is informed at a third step Sa3. For example, the call party number is informed as "090-3123-4567". When no call party number is informed at the third step Sa3, the transmission-reception control section 5 sets the telephone number with no number information at a fourth step Sa4. For example, the telephone number with no number information has "000-000-0000".

When the call party number is informed at the fourth step Sa4 or when the call is carried out at the second step Sa2, transmission-reception control section 5 judges whether or not the telephone number informed upon the reception or the telephone number originated upon the call (hereinafter, the telephone number is referred to as call and reception telephone number according to need) is already recorded in the telephone number memory 9 at a fifth step Sa5.

When the call and reception telephone number is already recorded in the telephone number memory 9 or when the telephone number with no number information is set at the fourth step Sa4, "1" is added to the total communication number of the corresponding call and reception telephone number in the telephone number memory 9 at a sixth step Sa6. Subsequently, the sum of the total communication duration time and the present communication duration time is obtained as a sum communication duration time. The sum communication duration time is renewed as the total communication duration time at a seventh step Sa7. Operation returns back to the first step Sa1. When the call and reception telephone number is not recorded in the telephone number memory 9 at the fifth step Sa5, the transmission-reception control section 5 judges whether or not any telephone number is already recorded in the telephone number memory 9 at an eighth step Sa8.

When the telephone number is not recorded in the telephone number memory 9 at all, the call and reception call telephone number and the communication duration time call are newly recorded and the communication number is set to "1" at a ninth step Sa9. Thereafter, the date of the communication is recorded in the telephone number memory 9 as the data recording start day at a tenth step Sa10. Operation returns back to the first step Sa1.

In case where any telephone number is already recorded in the telephone number memory 9 as the result of judgement of the eighth step Sa8, the call and reception telephone number and the communication duration time are newly written and the communication number is set to "1" at an eleventh step Sa11. Operation becomes end.

Figure 6:
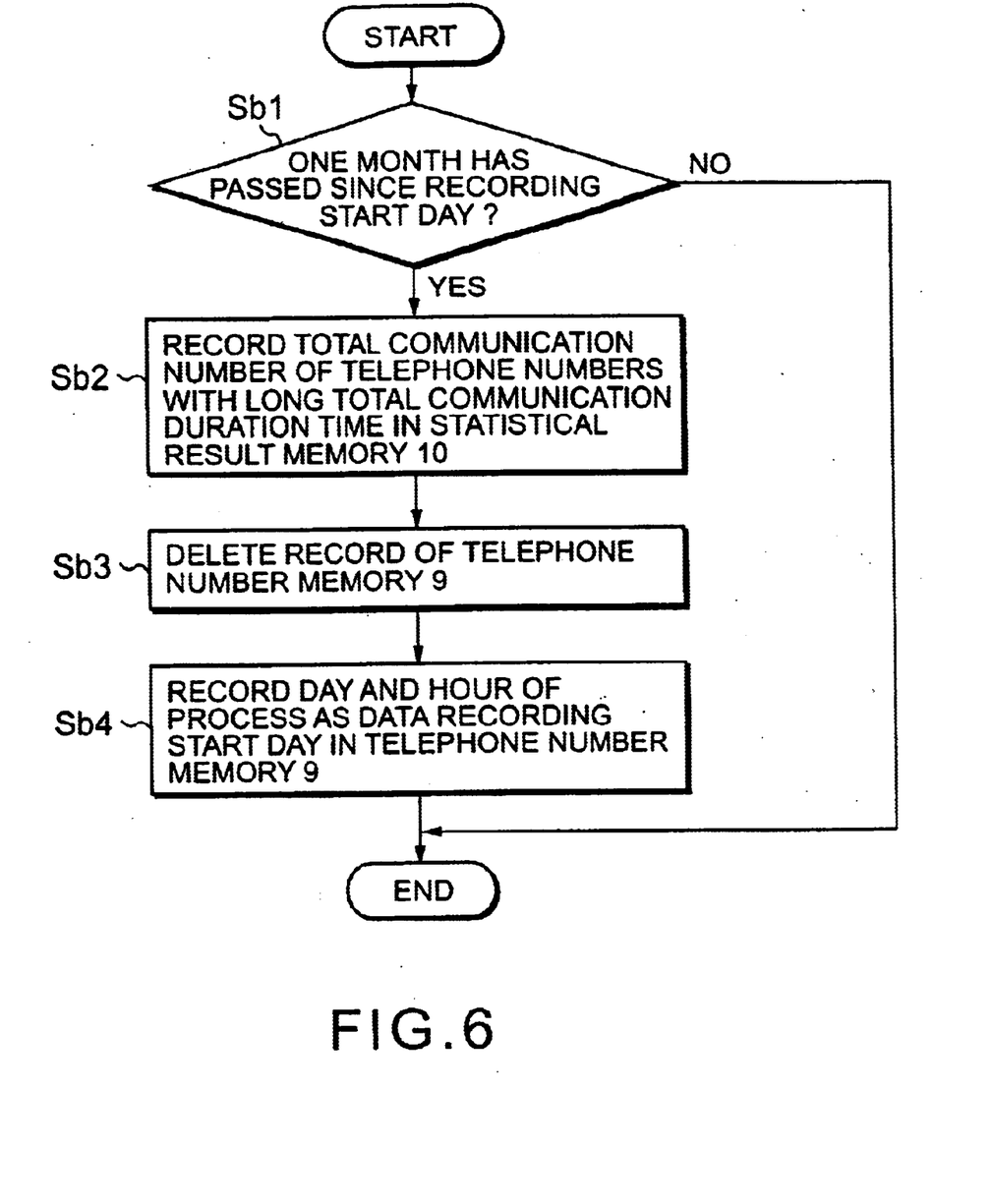
FIG. 6 is a flow chart for describing a statistical result recording process in the telephone terminal illustrated in FIG. 1.

Referring to FIG. 6, the statistical result recording process is performed when the time becomes 0 a.m., in the example being illustrated. Operation is carried out at which whether or not one month has passed since the data recording start day at a first step Sb1. When one month has not passed since the data recording start day, the operation becomes end.

When one month or more than one month has passed since the data recording start day, the total communication number of telephone numbers with long total communication duration time among the telephone numbers recorded in the telephone number memory 9 are written in the statistical result memory 10 in a predetermined number of a descending order together with the telephone numbers and the total communication duration time at a second step Sb2. Thereafter, deletion is carried out in concern with the telephone number, the total communication duration time, the total communication number, and the data recording start day recorded in the telephone number memory 9 at a third step Sb3. Subsequently, the date and hour of the third step Sb3 is recorded as the data recording start day in the telephone number memory 9 at a fourth step Sb4. Operation becomes end.

Figure 7:
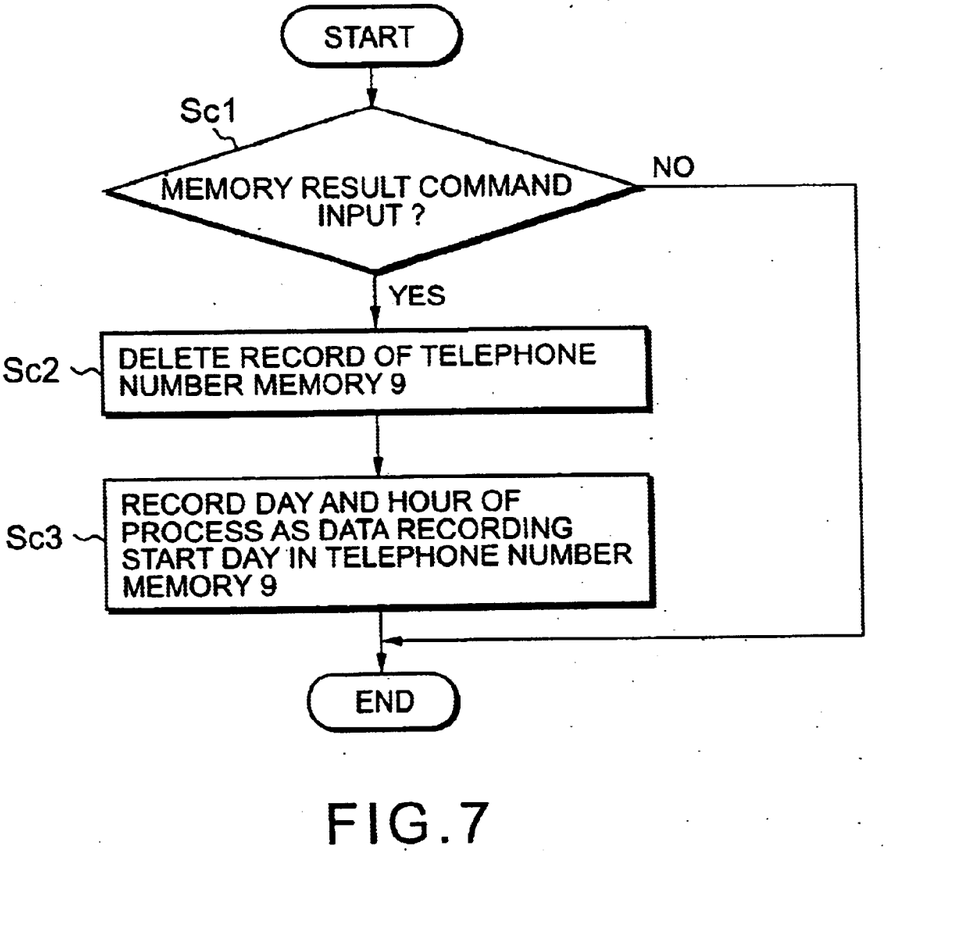
FIG. 7 is a flow chart for describing a reset process in the telephone terminal illustrated in FIG. 1.

Referring to FIG. 7, the reset process is carried out in response to the memory reset command. In the reset process, the data recording start day, the statistical result memory 10, and the telephone number memory 9 are reset. The memory reset command is given to the statistical result recording section 7 from the transmission-reception control section 5 upon key manipulation on the key board 11 by a user of the telephone terminal. The transmission-reception control section 5 judges whether or not the memory reset command is inputted at a first step Sc1. In case where the memory reset command is not inputted, the reset is completed.

When the memory reset command is inputted at the first step Sc1, the telephone number, deletion is carried out in concern with the total communication duration time, the total communication number, and the data recording start day, all of which are recorded in the telephone number memory 9, at a second step Sc2. Thereafter, the date and hour of the second step Sc2 is recorded as the data recording start day in the telephone number memory 9 at a third step Sc3. Operation becomes end.

Figure 8:
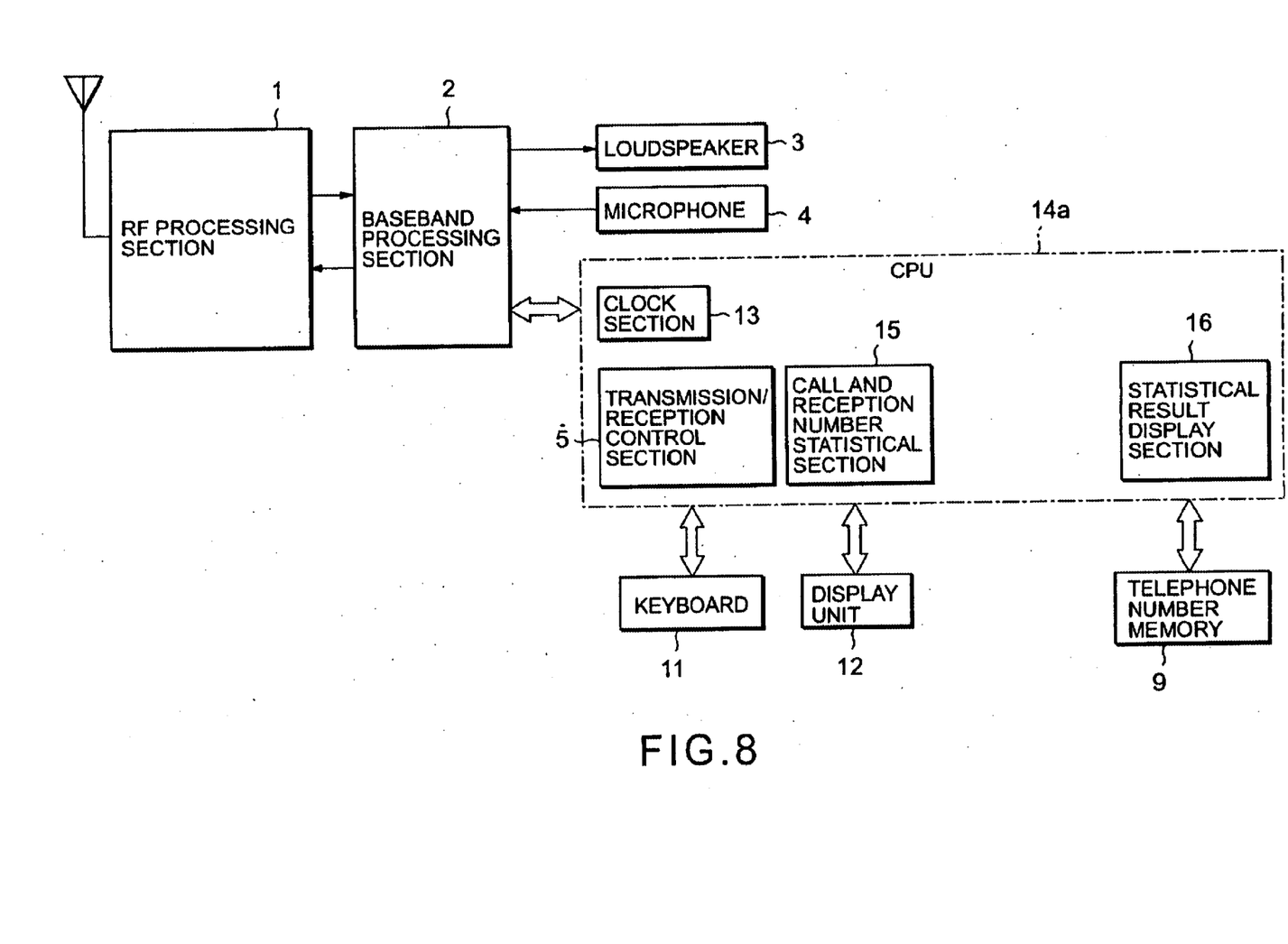
FIG. 8 is a block diagram of a telephone terminal according to a second embodiment of this invention.

Referring to FIG. 8, description will proceed to a telephone terminal according to a second embodiment of this invention. The telephone terminal illustrated in FIG. 8 comprises similar parts which are designated by like reference numerals and operable with likewise named signals. The illustrated telephone terminal comprises a CPU 14a which further has a call and reception number recording section 15 and a statistical operation display section 16. The call and reception number recording section 15 carries out a call and reception telephone number recording process on the basis of the telephone number and the communication duration time which are supplied from the transmission-reception control section 5. The statistical operation display section 16 carries out a statistical operation display process, as will be described later. In addition, the transmission-reception control section 5 informs the call and reception number recording section 15 of the telephone numbers of parties and each communication duration time.

On informing the call and reception number recording section 15 of the communication duration time, the transmission-reception control section 5 reads the communication start time and the communication end time out of the clock section 13. The transmission-reception control section 5 subtracts the communication start time from the communication duration time. The transmission-reception section 5 produces a statistical operation command, a telephone number data display command, and a memory reset command. The call and reception number recording section 15 carries out a memory reset process. In the memory reset process, the data recording start day and the telephone number memory are reset in response to the memory reset command. The memory reset command is given from the transmission-reception control section 5 to the call and reception recording section 15 upon key manipulation on the key board 11 by a user of the telephone terminal.

Figure 9:
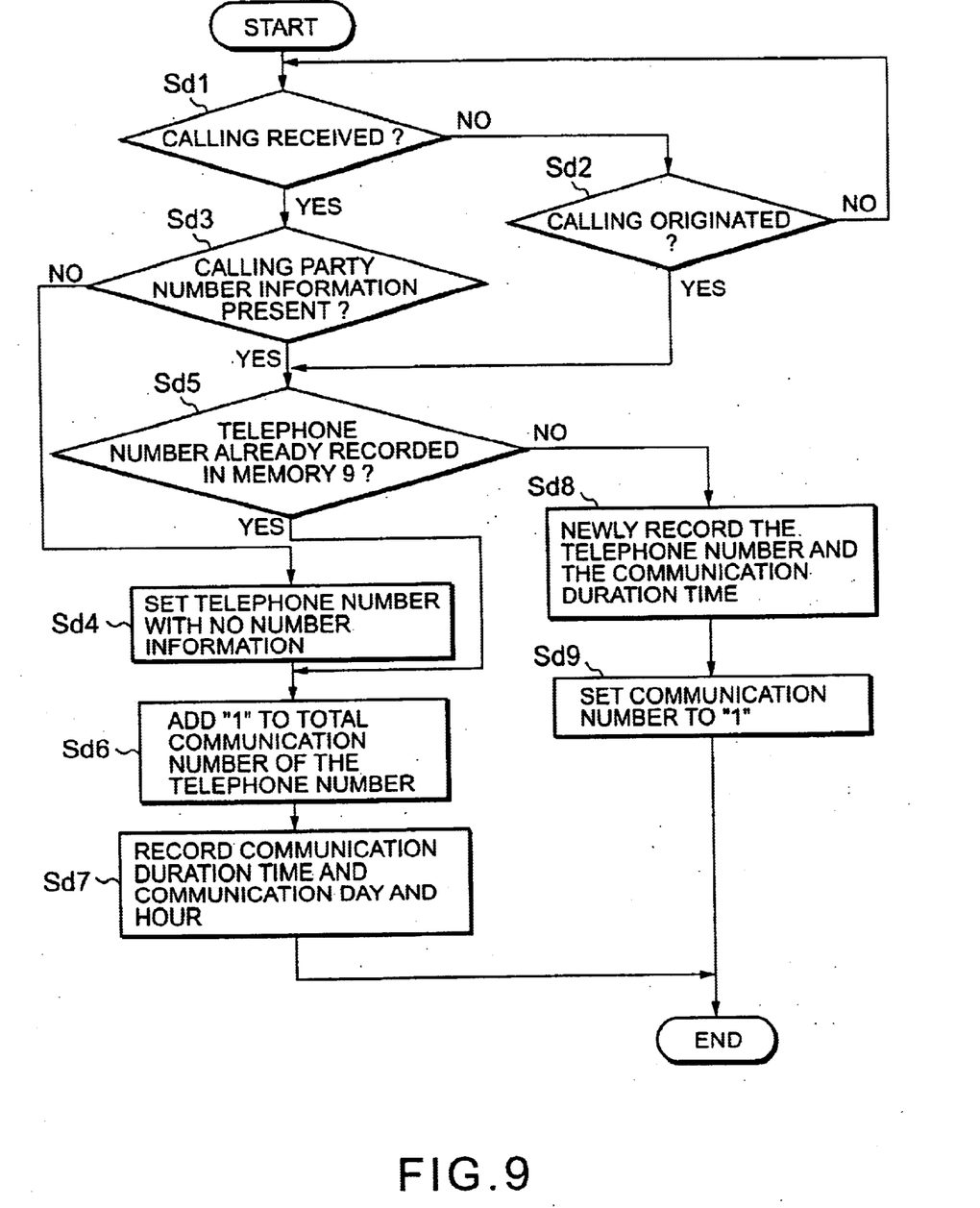
FIG. 9 is a flow chart for describing a statistical process of calling and reception telephone numbers in the telephone terminal illustrated in FIG. 8.

Referring to FIG. 9, the transmission-reception control section 5 judges whether or not there is a reception at a first step Sd1 in the call and reception telephone number statistical process. When there is no reception at the first step Sd1, the transmission-reception control section 5 subsequently judges whether or not there is a call at a second step Sd2. When the call is not made, operation returns back to the first step Sd1.

When there is the reception at the first step Sd1, the transmission-reception control section 5 subsequently judges whether or a call party number is informed at a third step Sd3. When no call party number is informed at the third step Sd3, a telephone number with no telephone information is set at a fourth step Sd4. When the call party number is informed at the third step Sd3 or when there is the call at the second step Sd2, the transmission-reception control section 5 confirms whether or not the reception telephone number or the call telephone number is already recorded in the telephone number memory 9 at a fifth step Sd5.

When the call and reception telephone number is already recorded in the telephone number memory 9 at the fifth step Sd5 or when the telephone number with no number information is set at the fourth step Sd4, "1" is added to the total communication number of the call and reception telephone numbers at a sixth step Sd6. The communication duration time and the communication date and hour of this communication are recorded at a seventh step Sd7. Operation becomes end.

When the call and reception telephone number is not equal to each of the telephone numbers recorded in the telephone number memory 9 at the fifth step Sd5, the call and reception telephone number and the communication duration time are newly written at an eighth step Sd8. The communication number is set to 1 at a ninth step Sd9. Operation becomes end.

Figure 10:
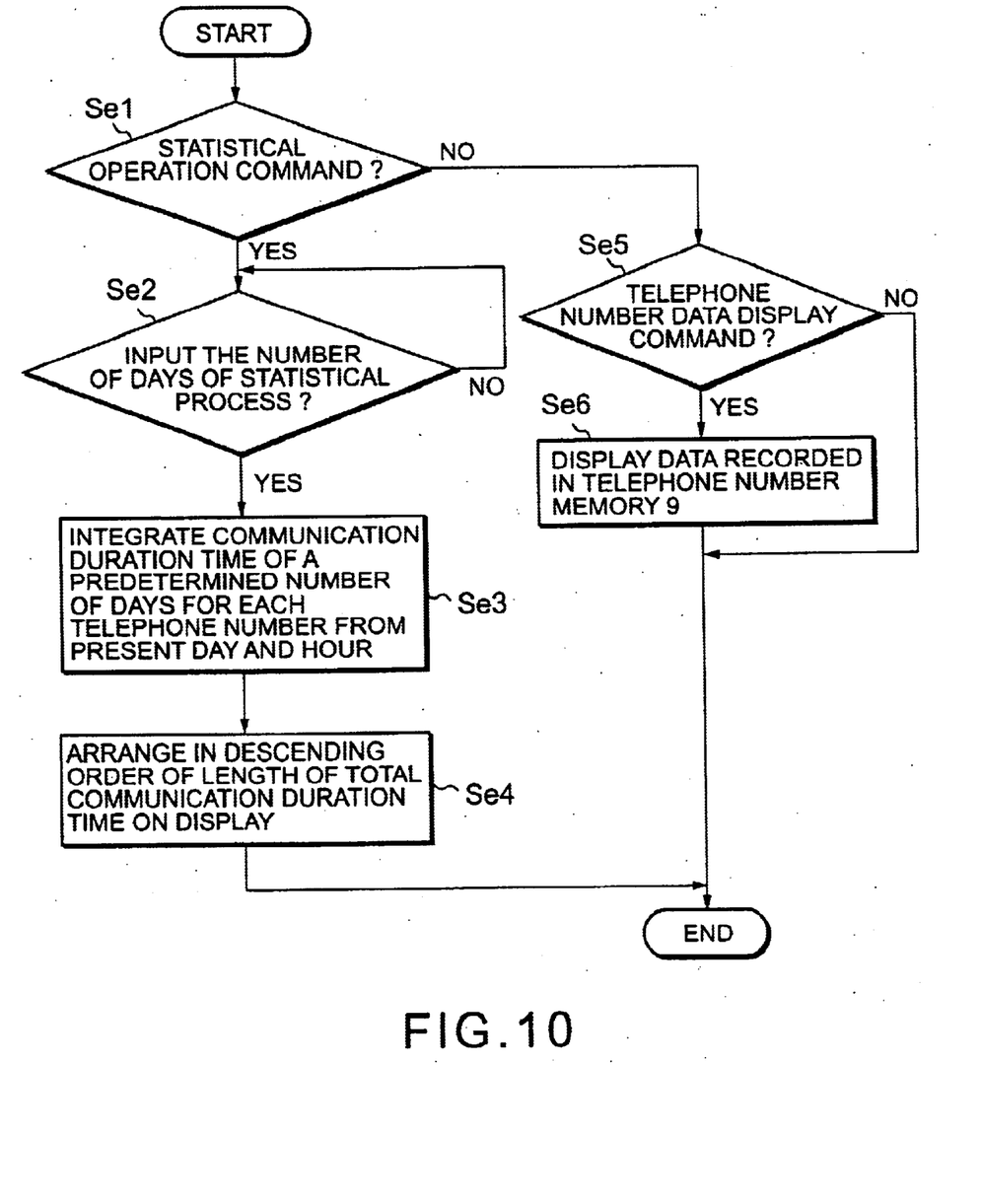
FIG. 10 is a flow chart for describing a statistical operation displaying process in the telephone terminal illustrated in FIG. 8.

Referring to FIG. 10, the transmission-reception control section 5 judges whether or not a statistical operation command is outputted from the key board 11 at a first step Se1 in the statistical operation process. When the statistical operation command is outputted, the transmission-reception control section 5 waits an input of statistics days from the key board 11 at a second step Se2. The inputted statistics days are given from the transmission-reception control section 5 to the statistical operation display section 16. In order to obtain integrated values, integration is carried out in concern with the communication duration time of statistics days from the present day and hour back to the past day and hour in each telephone numbers among the data recorded in the telephone number memory 9 at a third step Se3. The integrated values are arranged in a descending order of the length of the total communication duration time to be displayed at a fourth step Se4. Operation becomes end.

Figure 11:
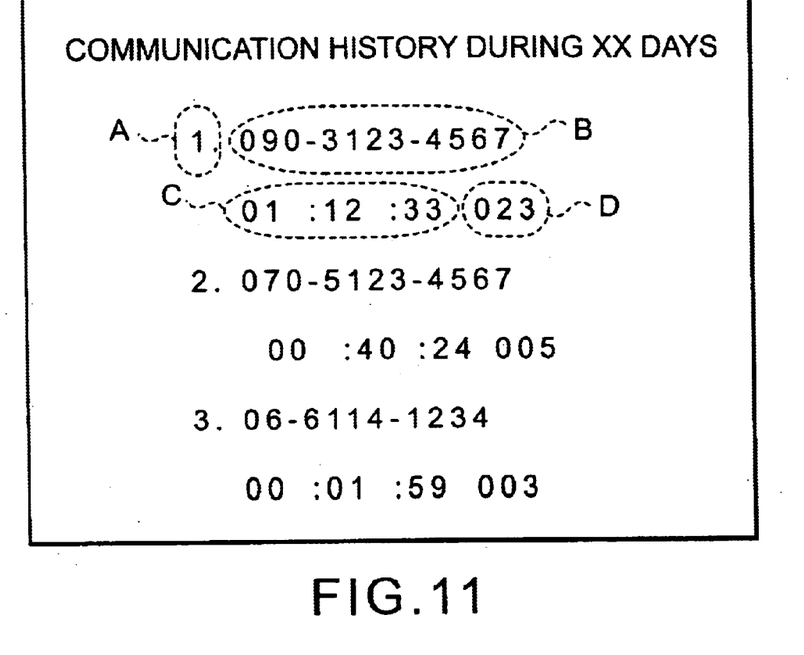
FIG. 11 is an example of a statistical operation displaying in the telephone terminal illustrated in FIG. 8.

FIG. 11 is an example of statistical operation. In FIG. 11, a broken line A indicates a rank of the length of the total communication duration time. A broken line B indicates a telephone number of called party. A broken line C indicates a total communication duration time. A broken line D indicates the total communication number.

In case where no statistical operation command is outputted in the first step Se1, the transmission-reception control section 5 subsequently judges whether or not the telephone number data display command is outputted from the key board 11 at a fifth step Se5. When the telephone number data display command is outputted at fifth step Se5, data recorded in the telephone number memory 9 is displayed at a sixth step Se6. Operation becomes end. With such a process, it is possible to confirm the communication day and hour and the total communication duration time in each telephone number.

Figure 12:
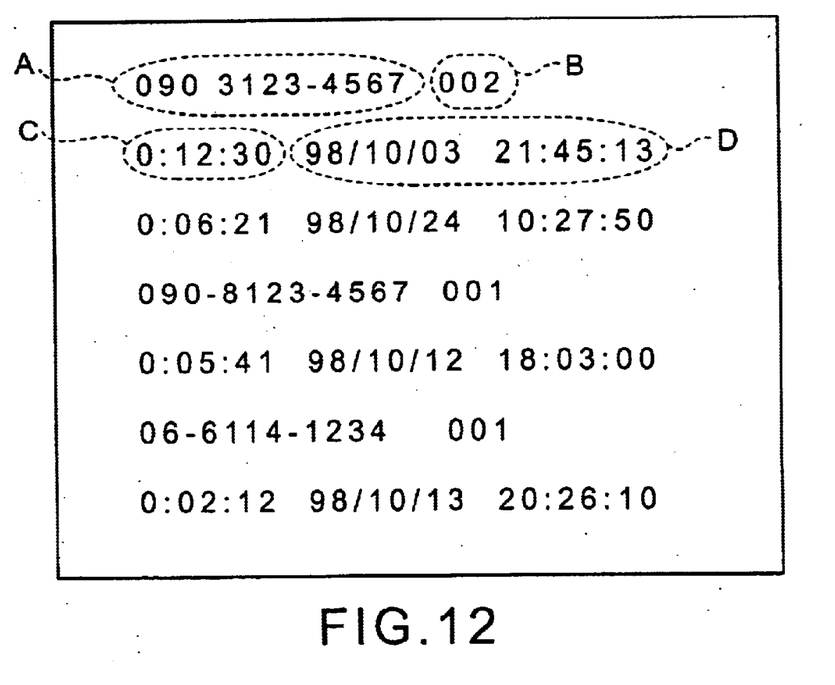
FIG. 12 is a display example of data recorded in a telephone number illustrated in FIG. 8.

FIG. 12 is an example of data recorded in the telephone number memory 9. In FIG. 12, a broken line A indicates the telephone number. A broken line B indicates the total communication number. A broken line C indicates a communication duration time. A broken line D indicates the call start day and hour (communication date and communication start time).

In this way, it is possible to display the telephone numbers and their communication records in a descending order of the total communication number at the time of statistical operation display.

While this invention has thus far been described in conjunction with the preferred embodiments thereof, it will readily be possible for those skilled in the art to put this invention into practice in various other manners.

What is claimed is:

1. A telephone terminal connected to a line network and having an individual terminal number, comprising:

clock means for measuring date and hour;

memory means for memorizing a call telephone number as a communication telephone number on call, said memory means memorizing a reception telephone number as said communication telephone number on reception, said memory means further memorizing communication information in correspondence to said communication telephone number;

display means for displaying said communication telephone number and said communication information; and control means for controlling said memory means to make said memory means memorize said communication information in correspondence to said communication telephone number, said control means controlling said display means to make said display means display said communication telephone number and said communication information, said control means comprising:

statistical recording means for reading said communication telephone numbers out of said memory means, said statistical recording means reading a predetermined number of said communication information out of said memory means within a predetermined period from a recording start day in a descending order of the number of communications to produce a statistical result;

statistical result control means for deleting said communication telephone number and said communication information to write a present data as said recording start day in said memory means, said statistical result control writing said statistical result in a temporary memory means; and statistical result output means for reading said statistical result as a read-out result to output said read-out result to said display means.

2. A telephone terminal as claimed in claim 1, wherein said communication information has recording start day information, a cumulative communication duration time, the number of communications in each of communication telephone numbers.

3. A telephone terminal as claimed in claim 2, wherein according to claim 2, said control means calculates a sum of a communication duration time and said cumulative communication duration time to produce a renewal cumulative communication duration time in correspondence to said communication telephone number when said communication telephone number is memorized in said memory means on any one of call and reception, said control means adding one to said the number of communications.

4. A telephone terminal as claimed in claim 2, wherein said control means stores said communication telephone number and said communication duration time as said cumulative communication duration time in said memory means when said communication telephone number is not memorized in said memory means on any one of call and reception, said control means setting the number of communications to one.

5. A telephone terminal as claimed in any one of claims 3 or 4, wherein said control means comprises statistical output means for reading said communication telephone numbers out of said memory means to display said communication telephone numbers on said display means, said statistical output means reading a predetermined number of said communication information as a statistical result out of said memory means within a predetermined past days dated back from the present in a descending order of the number of communications to display said statistical result.

6. A telephone terminal as claimed in claim 5, wherein said telephone terminal further comprises input means for carrying out of input of a display command to request a display of said statistical result.

* * * * *